United States Patent

Beyer et al.

[11] Patent Number: 5,514,867
[45] Date of Patent: May 7, 1996

[54] APPARATUS FOR DETERMINING THE RADIAL INTENSITY DISTRIBUTION OF LASER RADIATION

[76] Inventors: Eckhard Beyer, Starkenburgring 23, D-6146 Aalsbach; Reinhard Kramer, Gernsheimer Str. 103, D-6102 Pfungstadt; Peter Loosen, Dorfstrasse 25a, D-5100 Aachen, all of Germany

[21] Appl. No.: 50,701

[22] PCT Filed: Sep. 6, 1986

[86] PCT No.: PCT/DE86/00358

§ 371 Date: Jul. 13, 1987

§ 102(e) Date: Jul. 13, 1987

[87] PCT Pub. No.: WO87/01447

PCT Pub. Date: Mar. 12, 1987

[30] Foreign Application Priority Data

Sep. 9, 1985 [DE] Germany .......................... 35 32 047.8

[51] Int. Cl.⁶ .......................... G01J 1/04; G01N 21/00; B23K 26/00
[52] U.S. Cl. .................. 250/227.11; 250/559.24; 250/206.1; 219/121.6; 356/123
[58] Field of Search .................. 250/206.1, 560, 250/227.11, 548, 231.1, 231.11, 559.3, 559.36, 559.24; 356/218, 123, 141.1, 152.1; 219/121.6, 121.61

[56] References Cited

U.S. PATENT DOCUMENTS

| 3,617,755 | 11/1971 | Arnaud . | |
| 4,009,392 | 2/1977 | Hanley | 356/123 |
| 4,035,088 | 7/1977 | Jenkins et al. | 356/218 |

FOREIGN PATENT DOCUMENTS

| 0067363 | 12/1982 | European Pat. Off. . |
| 3127086A1 | 1/1983 | U.S.S.R. . |

*Primary Examiner*—Stephone Allen
*Attorney, Agent, or Firm*—Ralf H. Siegemund

[57] ABSTRACT

A waveguide is arranged in radial extension on a support mounted in rotary manner and whose pivot pin is parallel to the laser beam axis. The outer end thereof intersects the laser beam during a rotation of the support and in each case detects a partial beam of the laser radiation. By means of the waveguide, said partial beam is supplied to a detector, which is arranged in fixed manner in the pivot pin of the support. A hollow waveguide or light guide serves as the waveguide. A parallel displacement of the pivot pin of the support is possible by means of a stepping motor to enable the complete beam profile to be determined by a plurality of sections through the laser beam. In place of the stepping motor, the support can be provided with several waveguides of different lengths, distributed with the same angular spacing over the support circumference and which successively supply the detected partial beams to the same detector.

23 Claims, 5 Drawing Sheets

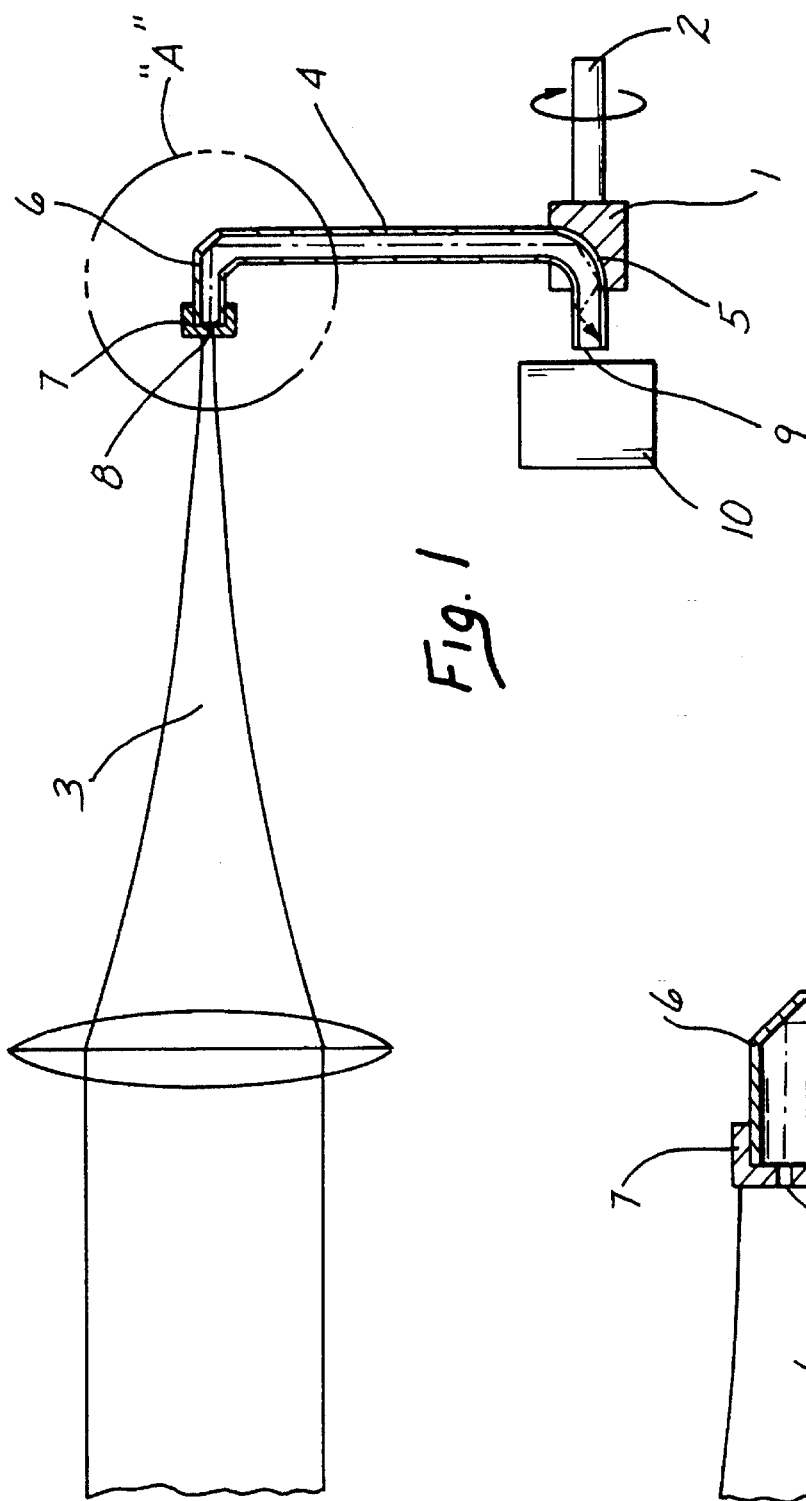
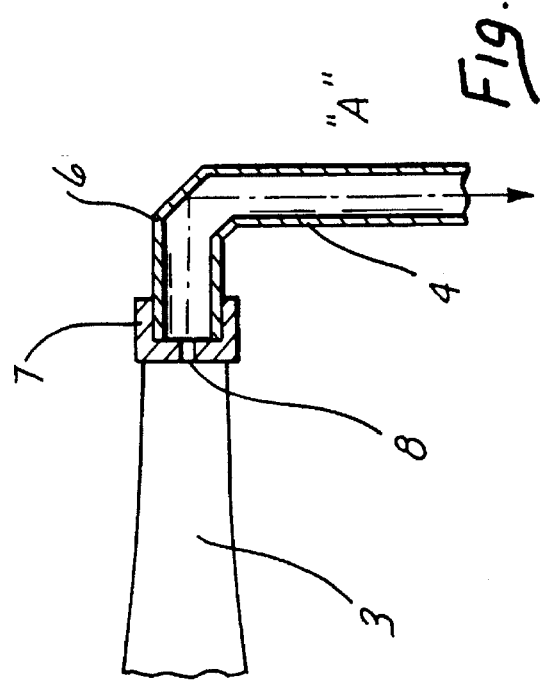

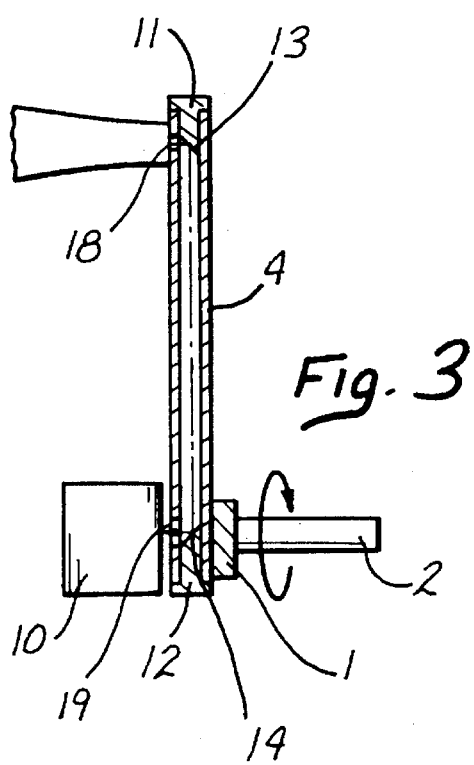
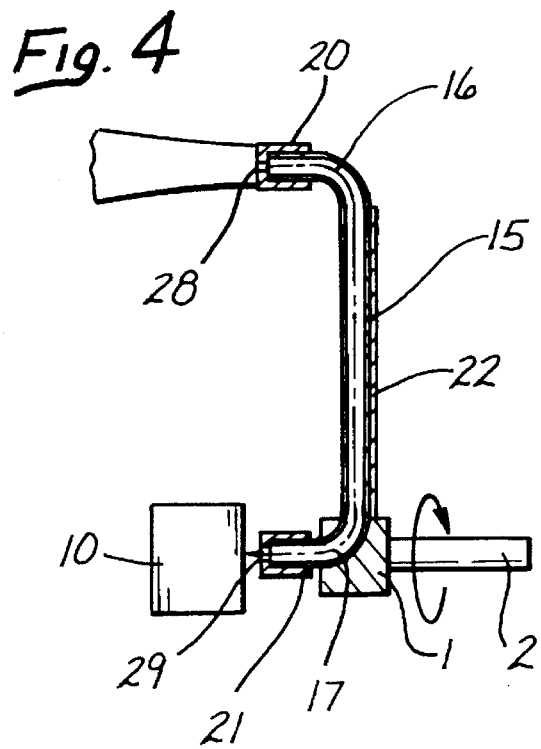
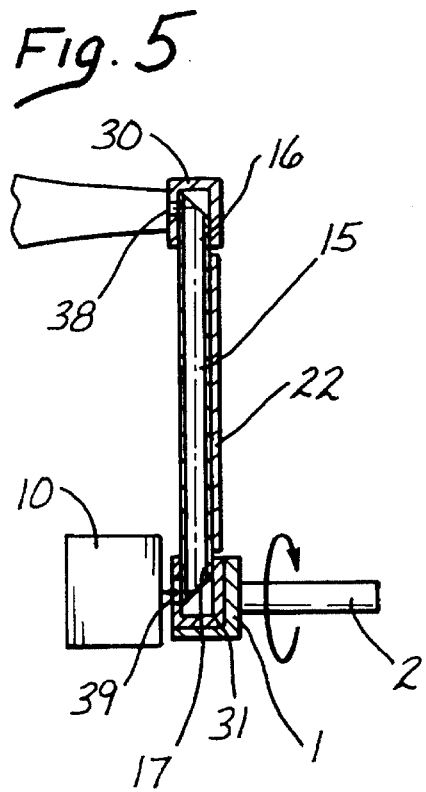
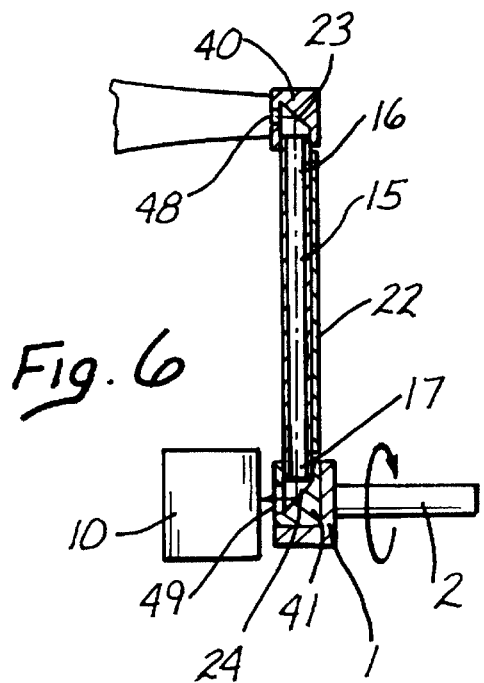

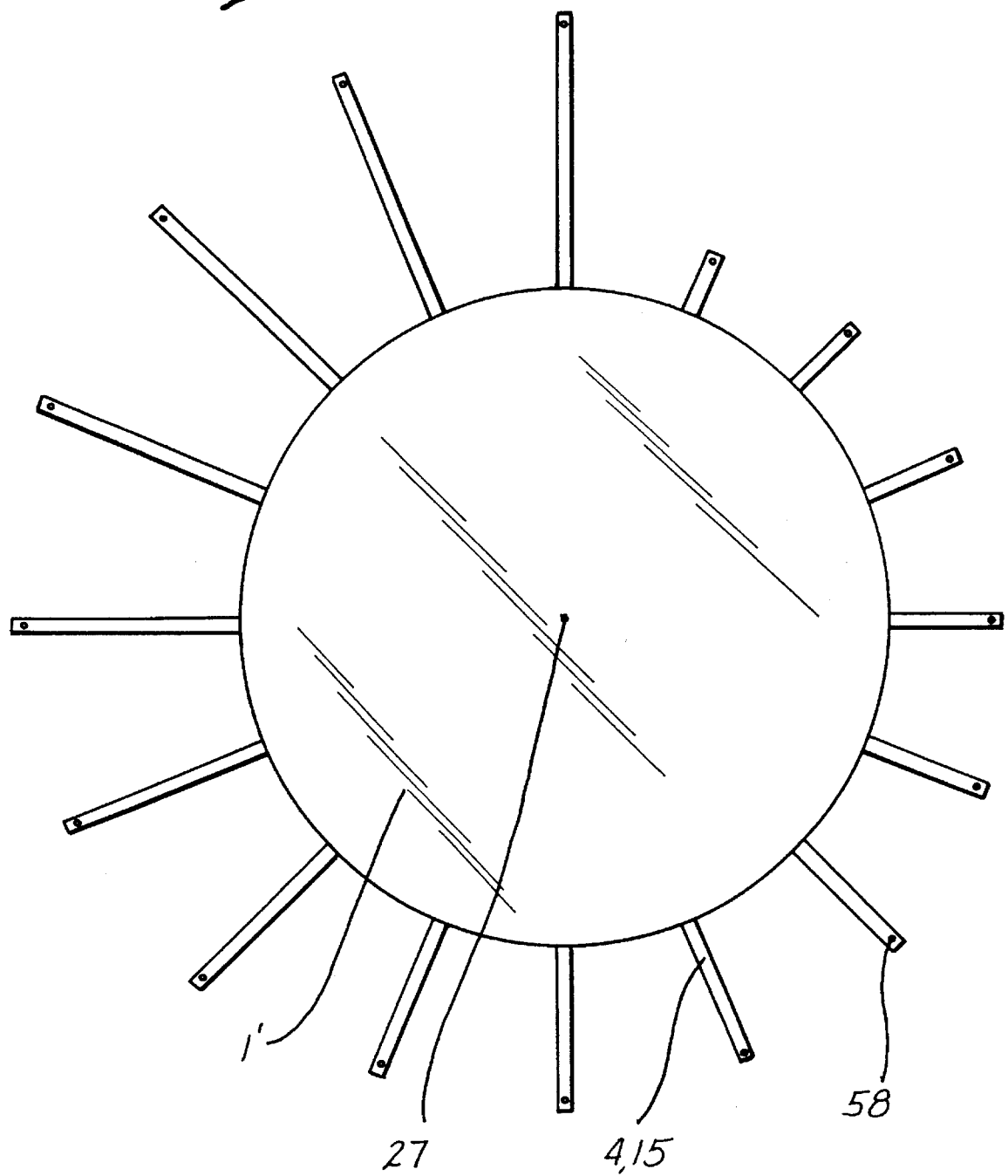

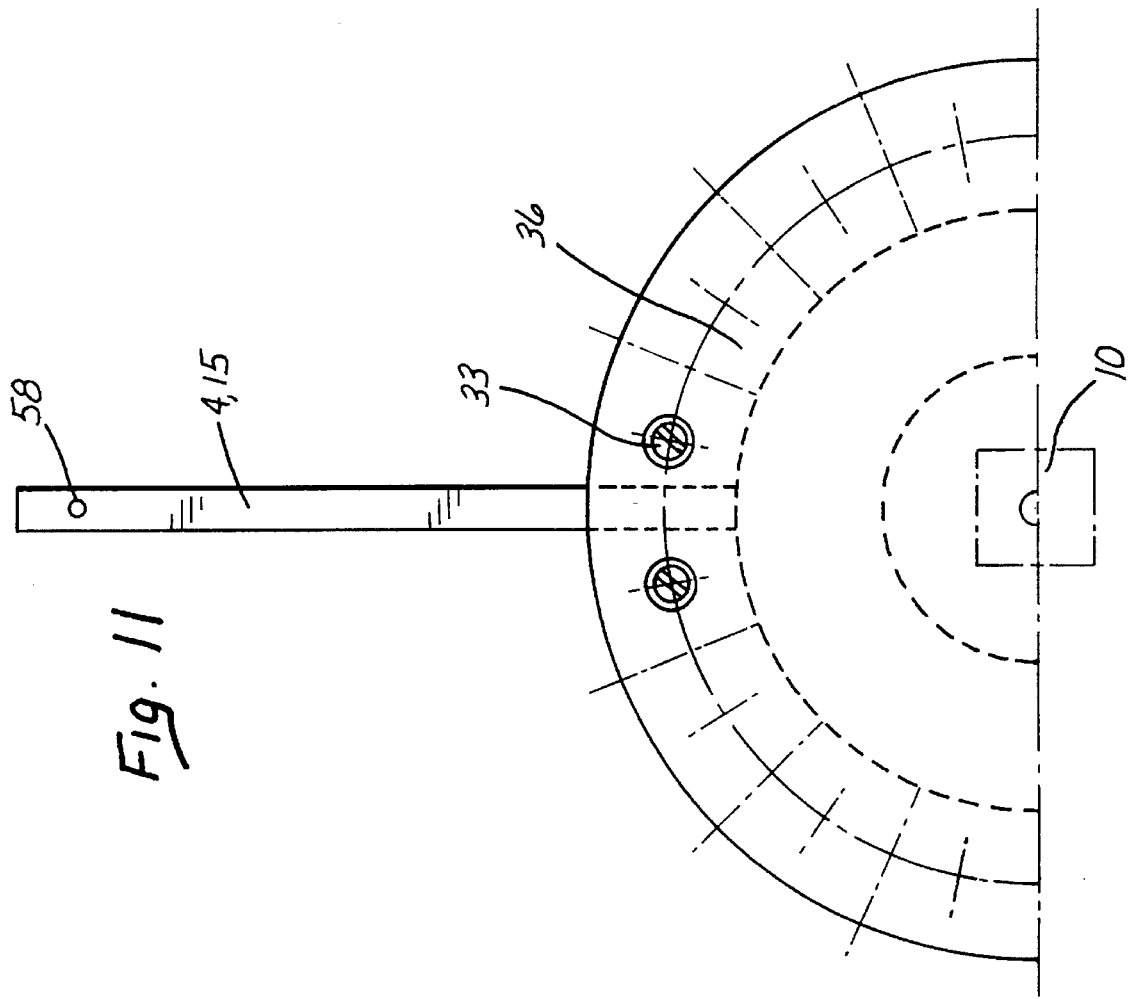
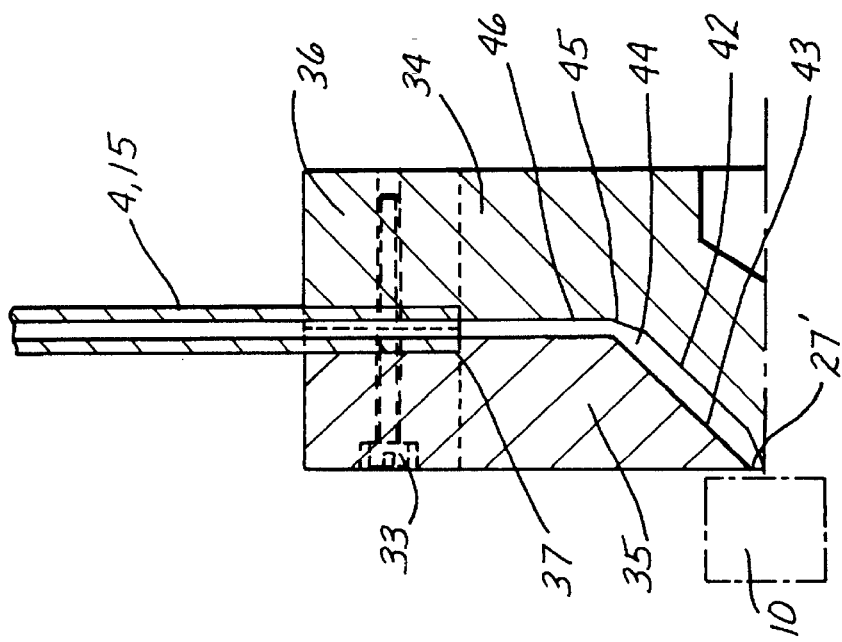

APPARATUS FOR DETERMINING THE RADIAL INTENSITY DISTRIBUTION OF LASER RADIATION

TECHNICAL FIELD

The invention relates to an apparatus for determining the radial intensity distribution of laser radiation, accompanied by the selective blocking out of a partial beam from the total beam.

When machining workpieces by means of a laser beam, the result is inter alia significantly determined by the radial intensity distribution of the laser radiation. The knowledge of this intensity distribution is consequently important. However, the investigation of the beam quality of the unfocussed laser beam is not sufficient for evaluating the machining result. In fact, for the machining process, significance is attached to the beam distribution and beam cross-section in the focus, as well as the focus position, relative to the workpiece surface.

PRIOR ART

It is known to allow a wire to rotate through the beam cross-section and on whose highly reflecting surface is expanded the laser radiation and deflected onto a detector positioned at an appropriate point with respect to the beam axis (Optics and Laser Technology 6, pp 149–153, 1982). However, with such an arrangement it is not possible to adequately determine the beam distribution in the focus and in the area in front of and behind the focus of a laser beam located between the focussing lens and a double focal length, due to the distortion errors which then occur. Moreover, several detectors are required for determining the complete two-dimensional intensity profile, it being necessary to align the arrangement with the beam centre, because otherwise a false picture would be obtained, which would lead to an incorrect valuation of the beam characteristics.

DESCRIPTION OF THE INVENTION

The problem of the present invention is to provide an apparatus making it possible to determine the intensity distribution both in an unfocussed and in a focussed laser bear using a minimum number of detectors, the arrangement being alignment-insensitive and also usable in the case of laser power levels exceeding 10 kW.

This problem is solved by an apparatus with the characterising features of claim 1.

On revolving the support in the case of the apparatus according to the invention, a section is taken through the laser beam. For detecting the complete profile, with the aid of a plurality of sections through the laser beam taken at different points, according to another development of the invention the support pivot pin can undergo parallel displacement by means of a stepping motor.

The particular advantages of the invention are that with the inventive apparatus the intensity distribution and beam cross-section can be determined both in an unfocussed laser beam and in the focussed, as well in the region located between the focussing lens and its double focussing length in front of and behind the focus of a focussed laser beam; only one detector is required, there is no need to centre to the beam centre, but deviations of the beam position can be determined and it is also possible to investigate high intensity laser beams.

BRIEF DESCRIPTION OF THE DRAWINGS

Embodiments of the invention are described hereinafter relative to the drawings, wherein show:

FIG. 1, a longitudinal section through an apparatus according to the invention.

FIG. 2, a larger scale detail of FIG. 1.

FIG. 3, a support with a straight tube closed at the ends by in each case one plug serving as the waveguide.

FIG. 4, a support with a light guide bent over at both ends as the waveguide.

FIG. 5, a support with a straight light guide, whose ends are partly ground at an angle of 45°.

FIG. 6, a support with a straight light guide with protective caps, whose bottoms are chamfered by 45° on the inside.

FIG. 9, the same in side view.

FIGS. 10 and 11 show a further embodiment of the invention.

WAYS OF PERFORMING THE INVENTION

Figure 7:
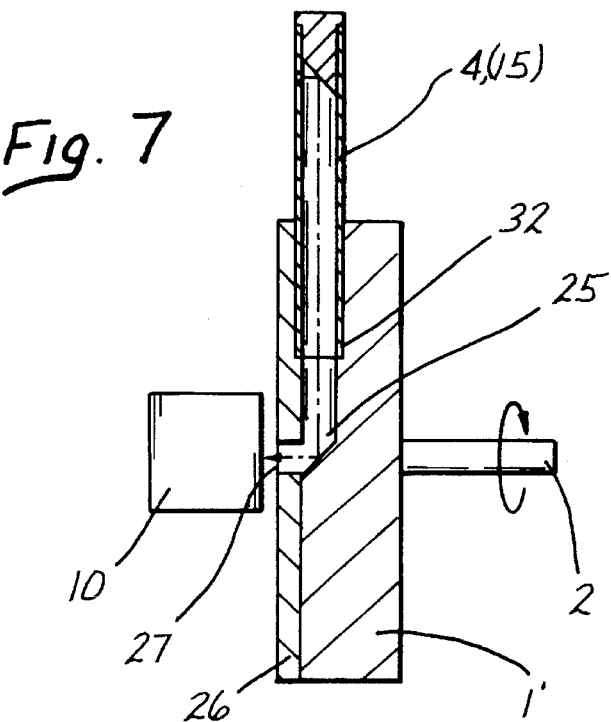
FIG. 7, a support with several waveguides in side view.

In FIG. 1, 1 is a support mounted in rotary manner, whose pivot pin or axis 2 is oriented parallel to the axis of laser beam 3. A hollow waveguide in the form of a tube 4, bent over by 90° at both ends and serving as the waveguide is connected to support 1. As shown on the support-side end 5 of tube 4, bending over can take place in one stage. However, the other end 6 of tube 4 is an example of bending divided up into several stages, the latter having the advantage that reflection losses are reduced.

The end 6 of tube 4 passing through the laser beam 3 is closed with a cover 7, which is centrally provided with a bore 8 and is parallel to pivot pin 2. The diameter of the bore is a function of the beam cross-section and the internal diameter of tube 4. When using a $CO_2$ laser, when using the apparatus for a free-running beam, the bore diameter is preferably 0.5 to 1.0 mm, whilst for a focussed laser beam it is preferably 10 to 50 μm.

The other end 5 of tube 4 has an outlet port 9, which is concentric to pivot pin 2. A commercially available detector 10, e.g. a pyroelectric detector when used in conjunction with a $CO_2$ laser is positioned in fixed manner in front of the outlet port 9.

When the laser is switched on and support 1 is rotating, tube 4 is passed through the laser beam 3 once during each rotation of support 1. The fraction of the laser radiation which thereby passes through bore 8 into the interior of tube 4, is guided up to the outlet port 9 and imaged there on the fixed detector 10.

FIG. 2, which is a larger scale detail A of FIG. 1, shows the path of the radiation in tube 4 in the vicinity of bore 8. To keep damping to a minimum, the inner wall of tube 4 should be made from a material which is highly reflecting for the laser wavelength, such as e.g. copper, silver or gold, or should have a corresponding coating and if necessary the surface can be polished.

FIG. 3 shows an embodiment in which the ends of tube 4 are not bent over and are instead closed by plugs 11, 12, whose insides 13, 14 are chamfered by an angle of 45° with respect to pivot pin 2. Level with inside 14, tube 4 is provided with a bore 19, which corresponds to the outlet port 9 of FIG. 1.

FIG. 4 shows an embodiment in which a light guide 15 serves as the waveguide and is formed from one or more glass fibres and is provided at its ends 16 and 17 with protective caps 20, 21. At both ends 16, 17, light guide 15 is bent over by 90°, much as tube 4 in FIG. 1. Protective cap 20 has a concentric bore 28 (corresponding to bore 8 in FIG. 1) and protective cap 21 has a concentric bore 29 (corresponding to outlet port 9 in FIG. 1).

In FIG. 5 light guide 15 is straight and is partially ground at an angle of 45° to the guide axis at its two ends 16, 17, so that there is a total reflection of the incident beam on the ground plane. In the wall facing the laser, protective cap 30 has a bore 38 (corresponding to bore 8 in FIG. 1) and in the wall facing detector 10 protective cap 31 has a bore 39 (corresponding to outlet port 9 in FIG. 1).

FIG. 6 shows an embodiment, in which light guide 15 is once again straight, but is partially ground at its two ends 16, 17 under an angle of 90° to the guide axis and the bottoms 23, 24 of protective caps 40, 41 are chamfered by 45° on the inside. Bore 48 in protective cap 40 and bore 49 in protective cap 41 correspond to bores 38, 39 in FIG. 5. The interior of the protective caps 40, 41 is highly reflecting.

In order to prevent deformation of light guide 15, in the embodiment according to FIGS. 4, 5 and 6 a supporting member 22 is provided, to which the light guide 15 is fixed, e.g. by adhesion. The outer wall of the protective cap 20 or 30 or 40 intersecting the laser beam is highly reflecting in order to keep heating to a minimum.

FIG. 7 shows another construction of the object of the invention, in which a radial hollow wave guide is incorporated into the support and can be extended by an insertable waveguide. For this purpose, support 1' has a channel or duct 25 which, after manufacture, is covered by a plate 26, so that the duct 25 assumes the character of a hollow waveguide. The inner end of duct 25 is bent in such a way that the outlet port 27 of duct 25 in plate 26 is concentric to pivot pin or axis 2 of support 1'. It is advantageous for an optimum lossless beam guidance for the bend of duct 25 to be subdivided into several portions, preferably two bends of in each case 45°.

The outwardly directed end of duct 25 has a widened portion 32, in which is located a hollow waveguide in the form of a tube 4, as shown in FIG. 3, but without the inner plug 12 and without bore 19. In place of the hollow waveguide, it is also possible to provide a light guide 15 in the widened portion 32 of duct 25, as shown in FIGS. 4, 5 or 6, but with the beam emerging in the direction of duct 25.

Figure 8:
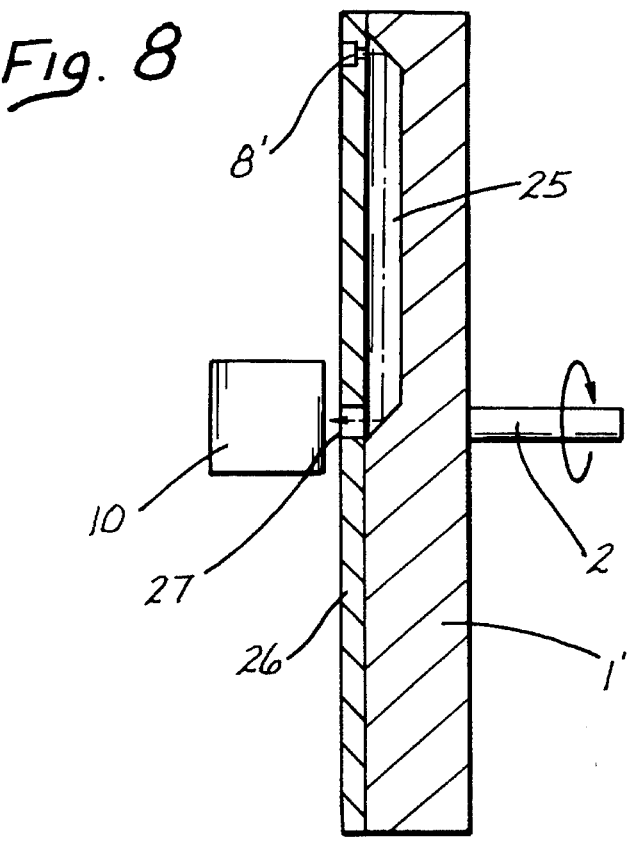
FIG. 8, a support formed from two disks in longitudinal section.

It also falls within the scope of the invention not to extend the hollow waveguide 25 incorporated into support 1' by an insertable wave guide 32 and instead to give support 1' a correspondingly larger diameter and to also bend by 90° the end of hollow waveguide 25 facing the support circumference, so that its inlet port faces the laser, as shown in FIG. 8. At this point, plate 26 has a bore 8', which corresponds to bore 8 in FIG. 1. However, this embodiment can only be used to a limited extent, because the laser beam is wholly or partly covered by support 1'. In the inventive embodiments described relative to FIGS. 1 to 8 on rotating support 1 or 1' a section is taken through the laser beam. For detecting the complete beam profile with the aid of a plurality of sections through the laser beam taken at different points, it is possible to bring about a parallel displacement of the pivot pin 2 of support 1 or 1' by means of a not shown stepping motor, so that individual section are successively obtained.

According to a further development of the invention several ducts are arranged in one plane and with in each case the same angular spacing within the support and waveguides are inserted in said ducts. The lengths of the parts of the waveguides projecting out of the support and therefore the spacings of there bores from the pivot pin decrease in uniform manner over the support circumference. It is possible in this way to detect several sections through the laser beam with a single rotation. It is particularly advantageous that only one detector is required.

FIG. 9 shows a support 1' with 16 waveguides (tube 4 or light guide 15), which in each case have an angular spacing of 22.5°. The length of the waveguide parts projecting out of support 1' uniformly decrease over the circumference of support 1'. Following a rotation the length of the shortest waveguide jumps to that of the longest waveguide. The same happens with regards to the spacing of their bores 58 (=8, 18, 28, 38 or 48) from the pivot axis of support 1', the spacing difference of the bores from the pivot axis being dependent on the beam or focus diameter. The parts of the laser radiation blocked out by the individual bores 58 are supplied to the outlet port 27 and are imaged from there on the fixed detector 10 in the form of parallel sections, even if the beam centre diverges from its desired position. The imaging of the beam profile on the detector is then correspondingly displaced, the amount of the displacement being used for an automatic correction of the beam position.

As difficulties can be encountered in bringing together several ducts 25 at outlet port 27, according to a further development of the invention an as shown in FIGS. 10 and 11, the support is formed preferably by two disks 34, 35 joined together by screws 33, which only rest on one another in a marginal zone 36 and in the latter are provided with recesses 37 for receiving tube 4 or light guide 15, whilst having in the inner part thereof a cone-shaped raised portion 42 or a depression 43 adapted thereto. The depression 43 passes into an outlet port 27' facing detector 10 and the annular clearance 44 between disks 34 and 35 serves as a duct. As the speed of the radiation is much greater than the movement speed of the waveguide bores 58, the individual sections through the radiation do not impede one another in clearance 44. When using the apparatus in conjunction with a $CO_2$ laser, the diameter of the outlet port 27' is approximately 1 to 2 mm.

This embodiment of the invention not only has the advantage that it can be more easily manufactured than a plurality of converging ducts, but it also permits an easy replacement of the waveguides, e.g. by those with a different bore diameter or a different length. It is merely necessary for this to somewhat loosen the adjacent screws and after replacing the particular tube or light guide to tighten them again.

According to a further development of the embodiment of the invention described hereinbefore relative to FIGS. 10 and 11, the transition 45 from the plane 46 of disk 34 to the conical raised portion 42 is chamfered, so that the reflection of the radiation is deflected into the correct path.

INDUSTRIAL USABILITY

With the object of the invention a section is taken through the laser beam on rotating the support. For detecting the complete beam profile with the aid of a plurality of sections through the laser beam taken at different points, the pivot pin of the support is displaced in parallel by means of a stepping motor. This can be carried out for control purposes, e.g. with $CO_2$ lasers or any other suitable laser used for machining workpieces, material surfaces, welding, etc.

| LIST OF REFERENCE NUMERALS | |
|---|---|
| 1 | SUPPORT (1' IN FIG. 8) |
| 2 | PIVOT PIN OF 1 |
| 3 | LASER BEAM |
| 4 | TUBE |
| 5 | SUPPORT-SIDE END OF 4 |
| 6 | OTHER END OF 4 |
| 7 | COVER |
| 8 | BORE |
| 9 | OUTLET PORT |
| 10 | DETECTOR |
| 11 | TOP PLUG |
| 12 | BOTTOM PLUG |
| 13 | INSIDE OF 11 |
| 14 | INSIDE OF 13 |
| 15 | LIGHT GUIDE |
| 16 | UPPER END OF 15 |
| 17 | LOWER END OF 15 |
| 18 | BORE |
| 19 | BORE (OUTLET PORT) |
| 20 | PROTECTIVE CAP OF 15 TOP |
| 21 | PROTECTIVE CAP OF 15 BOTTOM |
| 22 | SUPPORTING MEMBER FOR 15 |
| 23 | BOTTOM OF 20 |
| 24 | BOTTOM OF 21 |
| 25 | DUCT |
| 26 | PLATE |
| 27 | OUTLET PORT |
| 28 | BORE |
| 29 | BORE (OUTLET PORT) |
| 30 | PROTECTIVE CAP OF 15 TOP |
| 31 | PROTECTIVE CAP OF 15 BOTTOM |
| 32 | WIDENED PORTION OF 25 |
| 33 | SCREWS |
| 34/35 | DISK |
| 36 | MARGINAL ZONE |
| 37 | RECESSES |
| 38 | BORE |
| 39 | BORE (OUTLET PORT) |
| 40 | PROTECTIVE CAP OF 15 TOP |
| 41 | PROTECTIVE CAP OF 15 BOTTOM |
| 42 | RAISED PORTION |
| 43 | DEPRESSION |
| 44 | CLEARANCE |
| 45 | TRANSITION |
| 46 | PLANE |
| 48 | BORE |
| 49 | BORE (OUTLET PORT) |
| 58 | BORE |

We claim:

1. Apparatus for determining the radial intensity distribution of laser radiation, accompanied by selective extraction of a partial beam from the total beam, comprising;

a pivot pin having an axis;

a detector (10) fixed in realation to said axis;

a support (1,1') rotatably mounted on said pivot pin (2) and parallel to the laser beam axis; and a waveguide (4, 15) arranged in radial extension in or on the support (1,1'); said waveguide having an outer end intersecting the laser beam (3) during a rotation of said support (1,1') and on each occasion determines said partial beam of the laser radiation and supplies said partial beam to said detector (10).

2. Apparatus according to claim 1, the waveguide being constituted by a hollow waveguide having highly reflecting walls.

3. Apparatus according to claim 2, two ends of the hollow waveguide being bent over in at least one step by a total of in each case 90°.

4. Apparatus according to claim 2, said hollow waveguide being straight and being terminated at at least one end under an angle of 45° said termination having a wall facing the laser, there being a bore (18) in said wall, parallel to said pivot pin (2) the wall facing said detector (10) having a bore (19) concentric to said pivot pin (2).

5. Apparatus according to claim 1, the waveguide being a light guide (15) formed from one or more glass fibers and provided at both ends (16, 17) with a protective cap; an outer wall of the protective cap (20, 30, 40) intersecting the laser beam, being highly reflecting.

6. Apparatus according to claim 5, each of the two ends (16, 17) of said light guide (15) being bent over by 90°, each of said protective caps (20, 21) having a concentric bore (28, 29).

7. Apparatus according to claim 5, the light guide (15) being straight and being ground at at least one end (16) under an angle of 45° to the guide axis, the protective cap (30) at said one end having a wall in the vicinity of the ground point facing the laser, said wall of the cap having a bore (38) parallel to the pivot pin (2) and, in the case of a light guide (15) partly ground on either side, the other protective cap (31) has a bore (39) concentric to pivot pin (2) in the wail facing detector (10).

8. Apparatus according to claim 5, at least one end of the light guide (15) being ground under an angle of 90°; each protective cap having a bottom (23, 24) being chamfered by an angle of 45° on the inside, and interior surfaces of said protective caps (40, 41) being highly reflecting.

9. Apparatus according to claim 4, said hollow waveguide including a radially positioned duct (25) and a tube (4) inserted in a widened portion (32) of said duct and extending in radially outward direction, one end of thee tube being closed by said 45° end, a second, non-closed end of tube (4) being ground under an angle of 90° a radially inner end of duct (25) being bent so that its outlet port (27) is concentric to said pivot pin (2) of said support (1').

10. Apparatus according to claim 1, the pivot pin (2) of said support (1) being displacable in parallel.

11. Apparatus according to claim 9, there being several ducts arranged in said support (1') and in one plane and with the same angular spacing, there being a plurality of tubes respectively inserted in said ducts, said tubes projecting out of said support (1') at differing lengths such that the waveguide bores (58) are spaced from pivot pin (42) in a uniformly decreasing manner.

12. Apparatus according to claim 11, the support established by two, bolted together disks (34, 35), said disks abutting upon one another in a marginal zone (36), said marginal zone having recesses (37) for receiving said tubes (4), one of said disks having a cone-shaped raised portion (42) the other one of the disks having a depression (43) adapted to said raised portion, said depression (43) being continued in an outlet port (27') facing said detector (10) there being an annular clearance (44) between said disks (34, 35) serving as a duct that is common to said ducts.

13. Apparatus according to claim 12, a transition (45) from a plane (46) of said one disk to the cone-shaped raised portion (42) being chamfered.

14. Apparatus according to claim 1, said laser being a CO2 laser the diameter of any bore in the waveguide facing the laser for a free-running laser beam is 0.5 to 1.0 mm and is 10 to 50 μm for a focussed laser beam.

15. Apparatus according to claim 4, said hollow waveguide having a second termination having a wall facing said detector (10) there being a bore (19) concentric to said pivot pin (2).

16. Apparatus according to claim 7, said support including a radially positioned duct (25), said light guide (15) being inserted in a widened portion (32) of said duct and extending in radially outward direction, one end of the light guide being said 45° end, a second end of the light guide (15) facing a radially inner end of said duct (25) which is bent so that its outlet port (27) is concentric to said pivot pin (2) of said support (1').

17. Apparatus according to claim 16 there being several ducts arranged in said support (1') and in one plane and with the same angular spacing, there being a plurality of light guides respectively inserted in said ducts, said light guides projecting out of said support (1') at differing lengths such that light guide openings (58) are spaced from pivot pin (42) in a uniformly decreasing manner.

18. Apparatus according to claim 17, the support being established by two, bolted together disks (34, 35), said disks abutting upon one another in a marginal zone (36), said marginal zone having recesses (37) for receiving said light guides (15), one of said disks having a cone-shaped raised portion (42) the other one of the disks having a depression (43) adapted to said raised portion, said depression (43) being continued in an outlet port (27') facing said detector (10) there being an annular clearance (44) between said disks (34, 35) serving as a duct that is common to said ducts.

19. Apparatus according to claim 18, a transition (45) from a plane (46) of said one disk to the cone-shaped raised portion (42) being chamfered.

20. Apparatus according to claim 8, said support including a radially positioned duct (25), said light guide (15) being inserted in a widened portion (32) of said duct and extending in radially outward direction, one end of the light guide being said 45° end, a second end of the light guide (15) facing a radially inner end of said duct (25) which is bent so that its outlet port (27) is concentric to said pivot pin (2) of said support (1').

21. Apparatus according to claim 20, there being several ducts arranged in said support (1') and in one plane and with the same angular spacing, there being a plurality of light guides respectively inserted in said ducts, said light guides projecting out of said support (1') at differing lengths such that light guide openings (58) are spaced from pivot pin (42) in a uniformly decreasing manner.

22. Apparatus according to claim 21, the support being established by two, bolted together disks (34, 35), said disks abutting upon one another in a marginal zone (36), said marginal zone having recesses (37) for receiving said light guides (15), one of said disks having a cone-shaped raised portion (42) the other one of the disks having a depression (43) adapted to said raised portion, said depression (43) being continued in an outlet port (27') facing said detector (10) there being an annular clearance (44) between said disks (34, 35) serving as a duct that is common to said ducts.

23. Apparatus according to claim 22, a transition (45) from a plane (46) of said one disk to the cone-shaped raised portion (42) being chamfered.

\* \* \* \* \*